United States Patent [19]
Audoin

[11] 3,792,368
[45] Feb. 12, 1974

[54] METHOD OF TUNING THE OSCILLATION FREQUENCY OF THE RESONANT CAVITY OF A MASER OSCILLATOR TO THE TRANSITION FREQUENCY OF STIMULATED EMISSION OF THE ACTIVE MEDIUM OF SAID MASER

[75] Inventor: Claude Audoin, Ivry, France

[73] Assignee: Agence Nationale de Valorisation de la Recherche Anvar, Courbevoie, France

[22] Filed: Aug. 1, 1972

[21] Appl. No.: 277,079

[30] Foreign Application Priority Data
Aug. 6, 1971 France .............................. 71.28912

[52] U.S. Cl. .......................................... 331/3, 331/94
[51] Int. Cl. .............................................. H03b 3/12
[58] Field of Search .................................... 331/3, 94

[56] References Cited

UNITED STATES PATENTS 3,406,353 10/1968 Mueller .................................. 331/3
3,435,369 3/1969 Vanier ................................ 331/3 X

*Primary Examiner*—Herman Karl Saalbach
*Assistant Examiner*—Siegfried H. Grimm

[57] ABSTRACT

The method consists in periodically modulating the level of oscillation of the maser ; in detecting the phase variation of the maser oscillation with respect to the oscillation of a reference oscillator, namely the variation which takes place only in the event of mismatch of the resonant cavity of the maser and results from the modulation ; and in correcting the mismatch.

8 Claims, 6 Drawing Figures

METHOD OF TUNING THE OSCILLATION FREQUENCY OF THE RESONANT CAVITY OF A MASER OSCILLATOR TO THE TRANSITION FREQUENCY OF STIMULATED EMISSION OF THE ACTIVE MEDIUM OF SAID MASER

The device for carrying out the method comprises at least one reference oscillator, a two-input phasemeter such that a signal which is phase-dependent on the oscillation of the maser is applied to one input and the output signal of said reference oscillator is applied to the other input, and means for applying the output signal of said phasemeter to the maser cavity and correcting the difference between the maser oscillation frequency and the frequency of stimulated emission of the active medium of the maser.

This invention relates to a method for tuning the oscillation frequency of the resonant cavity of a maser oscillator to the transition frequency of stimulated emission of the active medium of said maser. Masers serve as oscillators which have the highest frequency stability at the present time and for this reason are mainly employed as frequency standard sources (atomic clock). This invention makes it possible to correct variations in the oscillation frequency of masers. The invention is also directed to a device for the practical application of said method.

In order that the invention may be more readily understood, a few fundamental concepts relating to the structure and operation of a hydrogen maser will first be recalled. It will nevertheless remain evident that the invention applies to other types of maser such as the rubidium maser, for example. In the ensuing description of the prior art and of the invention, reference will be made to the accompanying drawings, wherein.

Hydrogen atoms each consist of one electron and one proton. In accordance with the selection rules of quantum mechanics, these "proton-electron" systems can exist only in two possible states, namely one state with a total angular momentum F having a zero value ($F = 0$ in FIG. 1) and the other state with a total angular momentum equal to unity, this latter being equal to $h/2\pi$. The energy level E (FIG. 1) having the notation $F = 0$ corresponds to the lowest energy state and its magnetic quantum number $m_F$ is zero ($m_F = 0$). The higher energy level having the notation $F = 1$ gives rise under the action of a magnetic field having an intensity B to three Zeeman sub-levels, the magnetic quantum numbers $m_F$ of which are equal respectively to + 1, 0, and − 1. In a magnetic field of low value, which is the case when the maser is operating, it can be considered that the levels $F = 1$ $m_F = 0$ and $F = 0$ $m_F = 0$ are parallel. When an atom of hydrogen is in the energy state $F = 1$, $m_F = 0$, it can be de-excited by emission of a photon of energy $h\nu$ and transferred to the energy level $F = 0$. This energy emission $h\nu$ between the two levels $F = 1$, $m_F = 0$ and $F = 0$, $m_F = 0$ is obtained by producing a population inversion between these levels. It is this stimulated emission which characterizes maser action and this latter therefore takes place at a frequency $\mu$.

Figure 2:
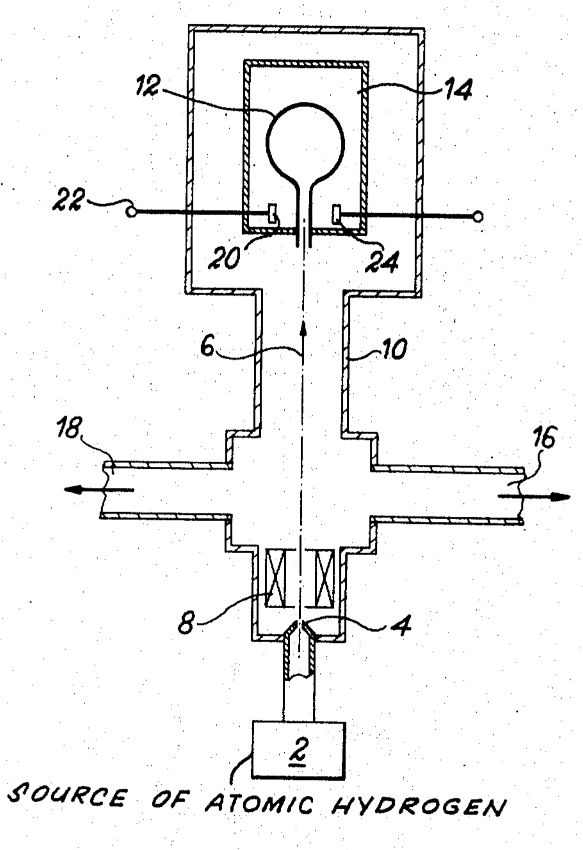
FIG. 2 is a diagrammatic sectional view of a hydrogen maser.

FIG. 2 shows diagrammatically a hydrogen maser in which the active maser medium is formed of hydrogen atoms. A source 2 of atomic hydrogen produces an atomic hydrogen beam 6 at its outlet 4. Said source 2 is usually a discharge tube supplied with molecular hydrogen. The atomic hydrogen beam 6 passes through a state selector 8 consisting of a hexapole magnetic lens which produces an inhomogeneous magnetic field having a variable intensity which can attain 7,000 Gauss or more. Under the action of this magnetic field, the energy level $F = 1$ gives rise to three Zeeman sub-levels. The hydrogen atoms in an energy state $F = 0$ and $F = 1$, $m_F = -1$ diverge from the hydrogen beam towards the walls 10 which constitute the casing of the maser. On the other hand, the hydrogen atoms which are in the energy states $F = 1$, $m_F = 0$ and 1 are focused on the axis of the beam and there is thus obtained downstream of the state selector 8 a focused beam of hydrogen atoms consisting solely of two energy states. The inlet of a storage cell 12 which receives the hydrogen atoms is placed substantially at the focusing point of the hydrogen beam. Said cell is placed within a microwave resonant cavity 14 which is tuned to the transition frequency $\mu$ of the stimulated emission of the hydrogen atoms. More precisely, the cavity is tuned to a frequency which differs from $\mu$ to a very slight extent. The two methods of tuning just mentioned permit correct tuning of this cavity without any further operation. A very high secondary vacuum is produced through the pumping outlets 16 and 18. De-excitation by stimulated emission of the hydrogen atoms contained in the cell 12 from the energy state $F = 1$, $m_F = 0$ to the energy state $F = 1$ produces a microwave frequency field within the resonant cavity 14. The energy of this field clearly increases with the number of de-excitations per stimulated emission and therefore increases within certain limits of variation in density of hydrogen atoms in the energy state $F = 1$, $m_F = 0$ which are contained in the cell 12. A magnetic field probe 20 such as a loop serves to sample said microwave frequency field and there is obtained at the output 22 an electric signal having a frequency which is equal to that of the electromagnetic field of the resonant cavity. Starting from a predetermined density of population inversion, the gain of the maser becomes very high, with the result that the stimulated emission is self-sustained and that the maser accordingly acts as an oscillator. The amplitude of the signal collected at the output 22 of the magnetic field probe 20 represents the level of oscillation of the maser. The dimensions of the resonant cavity 14 which is usually of cylindrical shape are so calculated that the frequency of one of its resonance modes can correspond to the transition frequency of the stimulated emission of the hydrogen atoms (the frequency $\mu$ produced by the transition from a state $F = 1$, $m_F = 0$ to the state $F = 0$). A device such as a semiconductor diode 24 permits fine adjustment of the resonant frequency of the resonant cavity 14 as a function of the reverse bias voltage of the diode.

The oscillation frequency of a maser oscillator depends, however, on the resonant frequency of its cavity. This effect is described by the so-called Townes formula, viz:

$$f - f_0 = Q_C/Q_1 \cdot \Delta f_{cav}.$$

wherein:

$Q_C$ is the coefficient of overvoltage of the resonant cavity, $Q_1$ is the coefficient of overvoltage of the atomic resonance employed in order to obtain maser action, $f$ is the oscillation frequency of the maser, $f_0$ is the correct value of the oscillation frequency, this latter being equal to the frequency $\mu$ of transition of the free atom (or of the molecule in the case of other types of maser) as corrected for small disturbing effects such as magnetic field, Doppler effect of the second order or the like, and $\Delta f_{cav}$ is the mismatch of the resonant cavity which produces the variation $(f - f_0)$ in the oscillation frequency.

By way of example, in a hydrogen maser in which $Q_C = 3 \times 10^4$ and $Q_1 = 10^9$, the oscillation frequency of the maser can be maintained stable to within $10^{14}$ at relative value only if the tuning frequency of the cavity is constant to within $3 \times 10^{-10}$ at relative value. Despite the precautions which may be taken (construction of a cavity having a very low temperature coefficient, temperature-regulation of the cavity, limitation of the effects of mechanical stress-relaxation of materials), it proves impossible to achieve stability of this order over long periods of time, namely of the order of one month or more. Up to the present time, the resonant frequency of a maser cavity has been adjusted to its correct value by detecting variations in frequency, the Townes formula being advantageously employed for this purpose. In fact, when the coefficient $Q_1$ of overvoltage of the atomic resonance is modified by changing the intensity of the atomic beam and therefore the density of the atoms within their storage cell, the frequency $f$ of oscillation of the maser is constant only if the deviation $\Delta f_{cav}$ is zero. This constitutes the most widely used cavity tuning test which was originally a manual operation but has since been rendered automatic.

This invention proposes a method and a device for tuning the resonant cavity of a maser oscillator which complies with practical requirements more effectively than has been the case in the prior art, especially insofar as the tuning operation aforesaid can be carried out with a greater degree of fineness and in a more convenient manner.

More precisely, the invention proposes a method of tuning the oscillation frequency of the resonant cavity of a maser oscillator to the transition frequency of the stimulated emission of the medium of said maser, characterized in that it consists:

in periodically modulating the level of oscillation of said maser, in detecting the phase variation of the maser oscillation, which exists only in the event of mismatch of said cavity and results from said modulation, with respect to the oscillation of a reference oscillator, and in correcting said mismatch.

Said periodic modulation of the level of oscillation can be carried out by modulating the intensity of the atomic beam which supplies said resonant cavity with the active medium.

Said periodic modulation of the level of oscillation can also be carried out between the state selector and the storage cell of the maser as a result of action produced on the atoms of said beam by two magnetic fields having perpendicular directions, namely a constant field which forms energy sub-levels of said atoms by Zeeman effect, and an alternating field which produces transitions between said Zeeman energy sub-levels. The amplitude of the field just mentioned is periodically variable with a frequency equal to the frequency of said modulation of the level of oscillation.

The invention is also directed to a device which essentially comprises at least one reference oscillator, a two-input phasemeter such that a signal which is phase-dependent on the oscillation of the maser is applied to one input and the output signal of said reference oscillator is applied to the other input, and means for applying the output signal of said phasemeter to the maser cavity and serving to correct the difference between said oscillation frequency of the maser and said frequency of stimulated emission of the active maser medium.

A more complete understanding of the invention will be obtained from the following description of two embodiments of the invention which are given by way of explanatory example but not in any sense by way of limitation.

The methods employed for tuning the resonant cavity of a maser oscillator have been based up to the present time on the application of the Townes formula. In other words, in the case of a mismatched cavity, modulation of the coefficient of overvoltage of the atomic resonance as usually obtained by modulating the intensity of the atomic beam causes a variation in the oscillation frequency of the resonant cavity. A frequency control system had accordingly been employed heretofore in order to tune the resonant frequency of the maser cavity. In accordance with the present invention, the phase and not the frequency of the maser oscillation is observed. This novel method of tuning is based on the following facts which have been revealed by the inventors: a variation in the level of oscillation of the maser necessarily causes a variation in the phase of its oscillation unless the resonant cavity is correctly tuned. The phase variation is givn by the following formula:

$$\phi_T - \phi_O = 2\,\pi T_2 \cdot (f - f_O)\ \mathrm{Log}\ (b_T/b_O)$$

wherein:

$f_O$ is the oscillation frequency of the maser when the cavity is correctly tuned, $f$ is the oscillation frequency of the maser in the case of a given mismatch of the resonant cavity, $T_2$ is a time constant which is characteristic of the atoms of the active medium, as related to the parameter $Q_1$ which was previously defined by the relation $T_2 = Q_1/\pi f_O$ , $b_O$ is the reference level of oscillation at which the phase of the oscillation is $\phi_O$, $b_T$ is the level of oscillation at which the phase of the oscillation is $\phi_T$.

It is thus clearly apparent that a variation in the level of oscillation $b_T$ causes a variation in its phase $\phi_T$. The method according to the present invention thus mainly consists in periodically modulating the oscillation level of the maser, in detecting the variations in the phase of this oscillation, then in correcting the mismatch of the resonant cavity as a function of the detected phase variation. Said periodic modulation can be produced as in the devices of the prior art by varying the intensity of the atomic beam which passes into the storage cell while modulating, for example, either the flow rate of molecular hydrogen which is supplied to the source of atomic hydrogen (discharge tube, for example) or the discharge current, or alternatively by means of a shutter placed on the path of the beam of hydrogen atoms. However, these methods are attended by major drawbacks : on the one hand, the use of a shutter which is placed in a vacuum is inconvenient and, on the other hand, it is preferable not to modify the atomic hydrogen source by reason of the delicate operation of this latter.

Modulation of the level of oscillation of the maser can advantageously be effected by producing action, not on the intensity of the atomic beam, but on its composition. In fact, it has been stated earlier that the state selector of the maser focuses and permits the possibility of penetration into the storage cell of hydrogen atoms which possess only the two energy states corresponding to the levels F = 1 with $m_F = +1$ and $m_F = 0$ whilst stimulated emission takes place only above the energy level F = 1, $m_F = 0$ (see FIG. 1). If the percentage of atoms in an energy state F = 1, $m_F = 0$ is caused to vary periodically with respect to the atoms which occupy the energy levels F = 1, $m_F = +1$ and $-1$, the population inversion between the levels F = 1, $m_F = 0$ and F = 0, $m_F = 0$ will be modulated periodically and the same will apply to the maser oscillation level; there then takes place a variation in the phase of the oscillation level. The composition of the atomic beam between the state selector 8 and the storage cell 12 is modified by causing two magnetic fields having perpendicular directions to produce action simultaneously on the hydrogen atoms, one field being constant and the other field being alternating and having a periodically variable amplitude.

Figure 1:
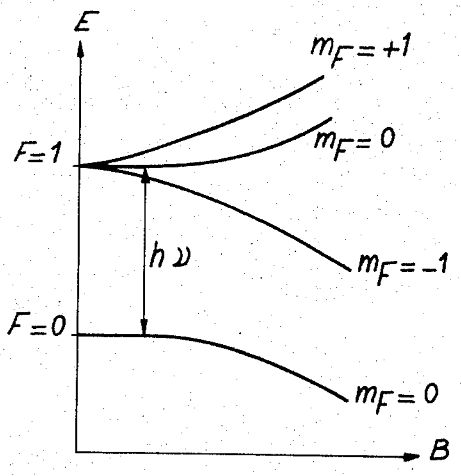
FIG. 1 represents the energy levels E of hydrogen atoms as a function of the intensity B of the applied magnetic field, the stimulated emission of the maser being made to occur between two of these energy levels.

Referring to FIG. 1, the constant magnetic field produces from the energy level F = 1 three Zeeman sublevels having the notation $m_F = +1$, $m_F = 0$, and $m_F = -1$. There corresponds to a predetermined intensity B of the constant magnetic field a predetermined difference between, on the one hand, the two pairs of levels F = 1, $m_F = 0$ and $m_F = +1$ and, on the other hand, F = 1, $m_F = 0$ and $m_F = -1$. There corresponds to this energy difference a magnetic field frequency (if this difference is $h\mu'$, said frequency is $\mu'$): the alternating magnetic field applied at right angles to the constant magnetic field is intended to produce the transitions between the two energy levels considered. It is therefore necessary to ensure that the frequency of said variable magnetic field corresponds to the difference between these two levels. The level of oscillation varies at the same rate as the variation in amplitude of the alternating magnetic field. Inasmuch as the difference between the two levels F = 1 with $m_F = 0$ and $m_F = +1$ is relatively small, the transitions between these levels take place at low frequency. By way of example, in the case of a steady magnetic field of 1 Gauss, the frequency of the variable magnetic field must be 1.4 Mc/sec. By means of this method, the composition of the atomic beam can therefore be modulated periodically without varying its intensity.

Figure 3:
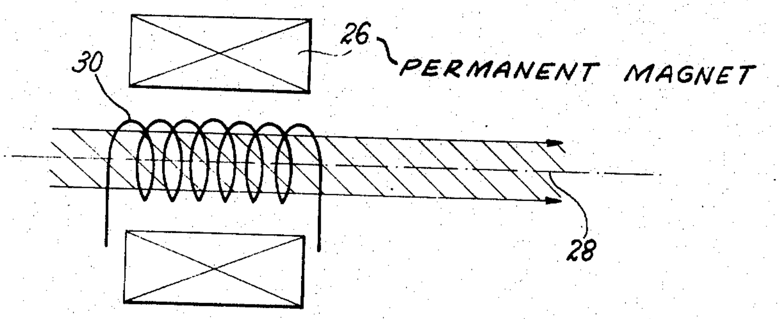
FIG. 3 is a diagrammatic view of a device for producing a periodic variation in the level of oscillation of the maser without changing the intensity of the atomic hydrogen beam as a result of the action of two magnetic fields having perpendicular directions, namely a constant field and a periodically variable field.

FIG. 3 shows very diagrammatically a device which is placed on the path of the atomic hydrogen beam and serves to vary the composition of the atomic beam. The steady or constant magnetic field is produced by a permanent magnet 26 having two poles placed on each side of the atomic beam 28 and of the solenoid 30. The variable magnetic field is produced by means of a solenoid 30 and the atomic beam 28 passes along the longitudinal axis of this latter. Said solenoid is supplied with alternating current at a frequency corresponding to the difference between the two levels F = 1 with $m_F = +1$ and $m_F = 0$, the amplitude of which is variable.

The phase modulation resulting from modulation of the oscillation level of the maser is then detected by one of the conventional methods of phase detection. In these methods, a comparison is usually made between the phase of the oscillator whose phase variations are to be observed and the phase of a reference oscillator. Consideration could be given to a design based on the following principle. Since maser oscillators have the highest stability at the present time, it would consequently be advantageous to compare the phase of one maser oscillator with the phase of another maser oscillator. The oscillations derived from the two masers, namely a maser to be tuned and a reference maser, would be amplified and their phases would then be compared by means of a phase-comparison device referred-to as a phasemeter. This latter delivers at its output a signal which is characteristic of the phase difference between the two oscillators and a servomechanism controlled by this signal would serve to adjust the resonant cavity of the maser to be tuned. For practical reasons, this method of tuning cannot readily be carried into effect in the manner indicated, especially by reason of the heavy expenditure involved, the difficulty of construction of amplifiers which operate at the maser oscillation frequency, and the very high cost price of the reference oscillator which is employed, namely a maser in this particular instance.

In consequence, it is more advantageous to employ another type of reference oscillator such as a quartz oscillator, for example. The system for automatic tuning of the cavity makes use of a quartz oscillator which is controlled in phase-dependence on the maser. The conventional system for controlling a quartz oscillator in phase-dependence on a maser oscillator is illustrated diagrammatically in FIG. 4.

In this figure, the quartz oscillator 32 which is to be phase-controlled in dependence on the oscillation of the maser 34 has two outputs : one output is connected to a first frequency synthetizer 36 and the other output is connected to a second frequency synthetizer 38. A frequency synthetizer is a device which delivers at its output an electric signal having a predetermined frequency which is different from the frequency of the signal applied to its input, the input and output signals being correlated in phase. By way of example, if the quartz oscillator 32 delivers a signal having a frequency in the vicinity of 5 Mc/sec, the frequency synthetizer 36 delivers at its output a signal having a frequency which is close to that of the maser oscillation, for example 1,400 Mc/sec if the frequency of the maser (hydrogen maser) is 1,420 Mc/sec, whilst the frequency synthetizer 38 delivers at its output a signal having a frequency equal to 5.75 kc/sec.

Figure 4:
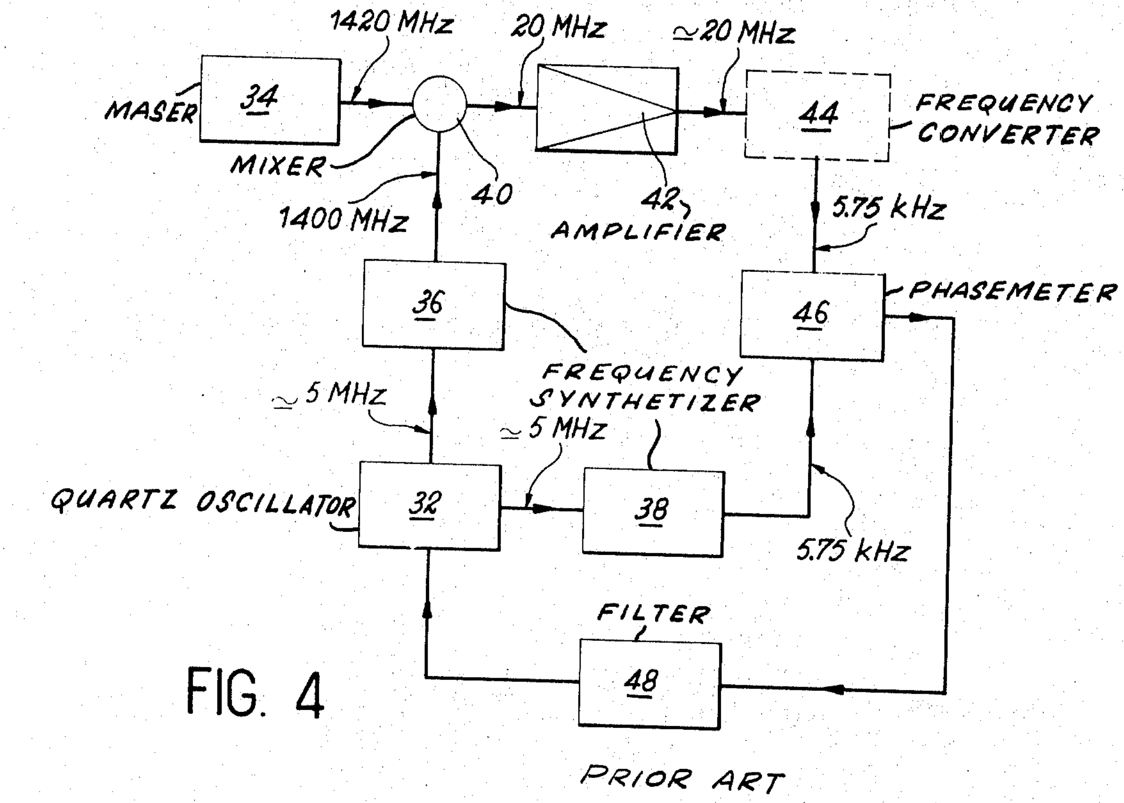
FIG. 4 is a schematic diagram of a conventional device for controlling an oscillator in phase-dependence on a maser oscillator.

A frequency mixer 40 which can be a phasemeter delivers at its output a signal having a frequency equal to the difference between the frequencies of the signals delivered by the maser 34 and by the frequency synthetizer 36. In the example which was selected earlier, the mixer 40 will deliver at its output a signal having a frequency of 20 Mc/sec. This signal is applied to the input of an amplifier 42. The diagram of FIG. 4 is in fact simplified since this conventional operation of frequency-shifting by means of a frequency mixer is repeated several times so as to obtain a number of intermediate frequencies : the system accordingly comprises a number of amplifying synthetizers and frequency mixers. In the example chosen, the amplifier 42 delivers an amplified signal having a frequency of 20 Mc/sec. Means designated diagrammatically by the reference 44 convert said frequency of 20 Mc/sec to a lower frequency of 5.75 kc/sec. A phasemeter 46 then compares the phase of the two signals having the same frequency which are derived from the means 44 and from the frequency synthetizer 38. The output signal of the phasemeter 46 is filtered by means of a filter 48, then applied to an electrical control device for controlling the frequency of the quartz oscillator. Said control device can be a reverse-biased diode of the "varactor" type. The filter 48, which is a low-pass filter, is employed to provide the control system with a suitable transfer function. The quartz oscillator 32 is thus phase-controlled in dependence on the maser oscillator 34.

Figure 5:
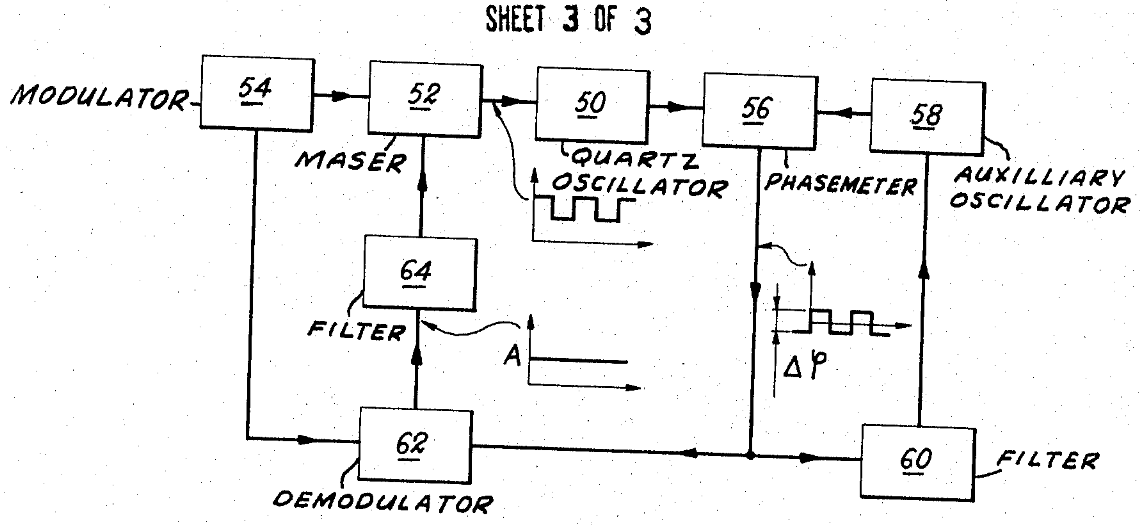
FIGS. 5 and 6 are schematic diagrams of two advantageous embodiments of the invention.

The general arrangement of a first advantageous embodiment of the invention is shown in FIG. 5. A quartz oscillator 50 is phase-controlled in dependence on the maser oscillator 52, the resonant cavity frequency of which is to be tuned, by means of the method illustrated in FIG. 4. This maser-dependent quartz oscillator 50 reproduces the variations in phase of the maser oscillation after a time interval whose value depends on the characteristics of the oscillator phase control in dependence on the maser. Variations in phase are produced periodically by means of a modulator 54. In the case of a mismatched resonant cavity, these phase variations are initiated by periodic modulation of the level of oscillation of the maser, either by acting on the intensity of the atomic beam which passes into the storage cell of the maser or by acting on the composition of said beam by means, for example, of the device shown diagrammatically in FIG. 3. This phase modulation can advantageously be in the form of square waves and the phase variations of the maser oscillation have substantially the shape of said square-wave modulation. The shape of the signals at the output of the elements 52, 56 and 62 is given by way of example and corresponds to this type of modulation. A phasemeter 56 effects a phase comparison between the oscillations of the oscillator 50 which is controlled in dependence on the maser and the oscillations of an auxiliary oscillator 58. It is necessary to maintain a predetermined mean phase relation between the phase of the maser-dependent oscillator 50 and the phase of the auxiliary oscillator 58. This mean relation is obtained by controlling the frequency of the auxiliary oscillator 58 by means of the output signal of the phasemeter which is filtered by a first filter 60. The auxiliary oscillator is usually a quartz oscillator.

The time constant of the control of the auxiliary oscillator 58 in dependence on the oscillator 50 is of sufficiently high value to ensure that the signal delivered by the phasemeter 56 should reproduce the phase variations of the maser 52 in a suitable manner. The output signal of the phasemeter is preferably in the form of square waves and it is necessary to demodulate this signal in order to obtain a signal having an amplitude A which is proportional to the phase-shift $\Delta\phi$ indicated by the phasemeter. This operation is carried out by the demodulator 62 which is controlled by the signal derived from the modulator 54 for modulating the oscillation level of the maser. The signal having an amplitude A which is delivered to the output of the demodulator 62 represents the mismatch of the maser resonant cavity. Said mismatch has a predetermined amplitude A but also a given sign : in other words, the phase variations are either in the same direction as the variations in maser oscillation level or in the opposite direction. The signal derived from the demodulator 62 must also take into account the sign of said mismatch. Said signal is filtered by means of a second filter 64, then applied to a device (not shown in FIG. 5) which serves to modify the tuning frequency of the resonant cavity. By way of example, this device can be a semiconductor diode which is reverse-biased by the filtered signal supplied by the demodulator 62.

In this exemplified embodiment, the period of modulation of the phase of the maser by means of the modulator 54 must have an intermediate value between, on the one hand, the time constant of control of the oscillator 50 in dependence on the maser and, on the other hand, the time constant of control of the auxiliary oscillator 58 in dependence on the oscillator 50. In this case, the oscillator 50 can be controlled in dependence on the maser under the best possible conditions which correspond to a relatively short time constant (of the order of 0.1 second in the case of a hydrogen maser and a quartz oscillator of good quality).

Figure 6:
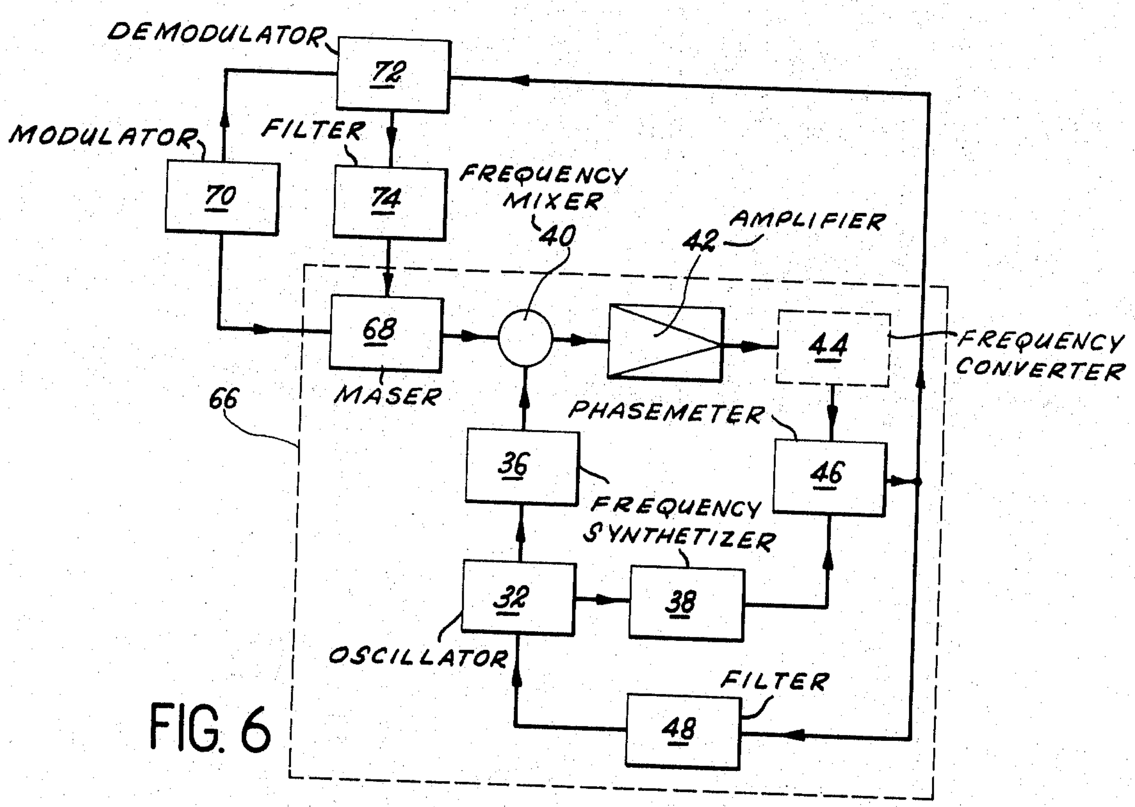

The general arrangement of a second embodiment of the invention is shown in FIG. 6. This second embodiment does not make use of an auxiliary oscillator 58 as in the first embodiment described since direct use is made of the loop for controlling the quartz oscillator in dependence on the maser. Said control loop is identical in every respect to the loop which was described earlier and illustrated in FIG. 4. The notations of the different elements of said control loop are the same as those of FIG. 4, the maser whose resonant cavity is to be tuned being designated in FIG. 6 by the reference numeral 68.

A modulator 70 causes a periodic variation in the level of oscillation of the maser 68 : this results in a periodic variation in the phase of the maser oscillation. The signal derived from the phasemeter 46 reproduces the phase modulation of the maser 68 provided, however, that the time constant of phase-control of the oscillator 32 in dependence on the maser is of higher value than the period of modulation of the phase of the maser which is imposed by the modulator 70. The signal derived from the phasemeter 46 is demodulated by means of a demodulator 72 which delivers at its output a signal having an amplitude and sign corresponding respectively to the magnitude and the direction of mismatch of the maser resonant cavity. Said signal is then filtered by means of a filter 74 in order that the transfer function of the phase control may be given a suitable form, for example with a view to ensuring stability of said control. The filter aforesaid is usually a low-pass filter since the signal at the output of the demodulator 72 varies very slowly.

The time constant of the system 66 which controls the oscillator 32 in dependence on the maser depends on the one hand on the sensitivity of the phasemeter 46 (value of the amplitude of the output level for a predetermined phase variation) and, on the other hand, on the characteristics of the quartz oscillator 32 (value of the frequency variation produced at the output of this latter in respect of a predetermined input signal which is fed into its frequency control system). This second embodiment involves greater practical difficulties than the first : the value of the time constant of the control system 66 must be a compromise between, on the one hand, the need to ensure good dependence of the quartz oscillator 32 on the maser (fast control) and, on the other hand, the need to ensure control which is not too fast in order that the phase variations of the maser can be observed at the output of the phasemeter 46 when the maser cavity is mismatched.

In the two examples of construction which have just been described, the time constant of the electronic tuning system is of the order of one hour. This makes it possible to distinguish the signal which is representative of any possible mismatch of the cavity from random phase variations of the maser and of the quartz oscillators. A time constant of this order is very suitable in practice since the resonant cavity has extremely low drift.

It is self-evident that this invention is not limited solely to the embodiments which have been described with reference to the drawings solely by way of example. In particular, the example of the hydrogen maser has been chosen only in order to clarify the general description of the invention but it is wholly apparent that the invention also applies to other types of maser such as the rubidium maser in particular. The values of the frequencies indicated in the description and in FIG. 4 are given only by way of example. The same applies to the shape of the signals illustrated in FIG. 5.

What we claim is:

1. A method of tuning the oscillation frequency of the resonant cavity of a maser oscillation to the transition frequency of stimulated emission of the active medium of said maser, said maser including a source of an atomic beam which passes through a state selector and supplies a storage cell in a resonant cavity consisting of the steps of periodically modulating the oscillation level of said maser by modulating the intensity of the atomic beam which supplies said resonant cavity with the active medium, detecting the phase variation of the maser oscillation, which takes place only in the event of mismatch of said cavity and results from said modulation, with respect to the oscillation of a reference oscillator, correcting said mismatch.

2. A method according to claim 1, wherein said periodic modulation of the oscillation level is carried out between the state selector and the storage cell of said maser as a result of action produced on the atoms of said beam by two magnetic fields having perpendicular directions, namely a constant field which forms energy sub-levels of said atoms by Zeeman effect, and an alternating field which produces transitions between said Zeeman energy sub-levels and the amplitude of which is periodically variable with a frequency equal to the frequency of said modulation of the oscillation level.

3. A method according to claim 1, including the steps of controlling an oscillator in phase-dependence on the oscillation of the maser to be tuned to detect said phase variation and comparing the phase variations of said phase-controlled oscillator with said reference oscillator.

4. A method according to claim 5, wherein said reference oscillator and said phase-controlled oscillator in dependence on the maser are quartz oscillators.

5. A device for tuning the oscillation frequency of the resonant cavity of a maser oscillator to the transition frequency of stimulated emission of the active medium of said maser, said maser including a source of an atomic beam which passes through a state selector and then supplies a storage cell in a resonant cavity comprising a two input phasemeter, an oscillator controlled in phase-dependence on the oscillation of the maser and connected to one of the two inputs of said phasemeter, an auxiliary oscillator connected to the other input of said phasemeter and the output signal of said phasemeter being applied to said auxiliary oscillator by means of a first filter to maintain a predetermined mean phase relationship between the oscillations of said phase-controlled oscillator and said auxiliary oscillator, a modulator for periodically modulating the oscillation level of said maser, a demodulator controlled periodically by the signals derived from said modulator and converting the signals derived from said phasemeter into a signal having a polarity and amplitude which represent respectively the direction and magnitude of frequency deviation of said resonant cavity and means receiving said signal from said demodulator through a second filter for modification of the resonant frequency of said cavity.

6. A device according to claim 5 wherein said modulator for periodically modulating the oscillation level of the maser to be tuned is connected between the state selector and the storage cell of said maser and consists of means for producing two magnetic fields having perpendicular directions, one of said fields being a constant field and the other of said fields being a field which varies periodically with a frequency equal to that of said modulation of the oscillation level of the maser.

7. A device according to claim 6, wherein said means consists of a solenoid in coaxial relation to the atomic beam which emerges from said state selector and passes into said storage cell, said atomic beam being intended to traverse said solenoid, and a permanent magnet having a pole on each side of said atomic beam.

8. A device according to claim 5, wherein said reference oscillator and said controlled oscillator in phase-dependence on said maser are quartz oscillators.

* * * * *